(12) United States Patent
Lu et al.

(10) Patent No.: US 11,686,522 B2
(45) Date of Patent: Jun. 27, 2023

(54) CHILLER SYSTEMS

(71) Applicant: B/E Aerospace, Inc., Winston Salem, NC (US)

(72) Inventors: Qiao Lu, Placentia, CA (US); Hong Liu, Chino Hills, CA (US)

(73) Assignee: B/E Aerospace, Inc., Winston Salem, NC (US)

( * ) Notice: Subject to any disclaimer, the term of this patent is extended or adjusted under 35 U.S.C. 154(b) by 210 days.

(21) Appl. No.: 17/164,377

(22) Filed: Feb. 1, 2021

(65) Prior Publication Data

US 2022/0243974 A1     Aug. 4, 2022

(51) Int. Cl.
*F25D 21/14* (2006.01)
*B64D 11/04* (2006.01)
*F25D 23/00* (2006.01)

(52) U.S. Cl.
CPC ............. *F25D 21/14* (2013.01); *B64D 11/04* (2013.01); *F25D 23/003* (2013.01)

(58) Field of Classification Search
CPC ....... F25D 21/14; F25D 23/003; B64D 11/04; F25B 2339/041; F25B 2339/047
See application file for complete search history.

(56) References Cited

U.S. PATENT DOCUMENTS

| | | | |
|---|---|---|---|
| 4,280,334 A | 7/1981 | Lakdawala | |
| 5,513,500 A | 5/1996 | Fischer et al. | |
| 6,857,285 B2 | 2/2005 | Hebert | |
| 9,862,496 B2 | 1/2018 | Burd | |
| 10,021,970 B2 | 7/2018 | Lu et al. | |
| 10,287,017 B2 | 5/2019 | Moran et al. | |
| 2004/0144118 A1* | 7/2004 | Hebert | F25B 40/00 62/305 |
| 2009/0107163 A1* | 4/2009 | Lu | F25D 17/06 62/291 |
| 2012/0312037 A1 | 12/2012 | Finney et al. | |

OTHER PUBLICATIONS

Extended European Search Report, of the European Patent Office, dated Jun. 21, 2022, in corresponding European Patent Application No. 22154611.2.

* cited by examiner

*Primary Examiner* — Elizabeth J Martin
(74) *Attorney, Agent, or Firm* — Locke Lord LLP; Daniel J. Fiorello; Gabriella N. D'Angelo

(57) ABSTRACT

A chiller system for a refrigerated space can include a chiller refrigeration system comprising a refrigerant loop for a chiller refrigerant to flow, a compressor, an evaporator, expansion device, and a condenser. The chiller can be positioned directly underneath the refrigerated space to provide cooled air directly to the refrigerated space without ducting. The chiller system can include a condensate path configured to receive condensate from the refrigerated space and to cool the chiller refrigerant in the chiller refrigeration system using the condensate.

20 Claims, 7 Drawing Sheets

CHILLER SYSTEMS

FIELD

This disclosure relates to chiller systems, e.g., for refrigerated spaces (e.g., aircraft galleys).

BACKGROUND

Traditional chiller systems can include a refrigeration system for cooling an aircraft galley for example, within a cabin of an aircraft, above the crown or below the deck. Conventional methods and systems have generally been considered satisfactory for their intended purpose. However, there is still a need in the art for improved chiller systems. The present disclosure provides a solution for this need.

SUMMARY

A chiller system for a refrigerated space can include a refrigeration system comprising a refrigerant loop for a chiller refrigerant to flow, a compressor, an evaporator, an expansion device, and a condenser. The chiller system can include a condensate path configured to receive condensate from the refrigerated space and to cool the chiller refrigerant in the chiller refrigeration system using the condensate.

The condensate path can include a de-superheating device configured to receive the condensate. The de-superheating device can be in thermal communication with the chiller refrigerant and/or the refrigerant loop between the compressor and the condenser. The de-superheating device can be a heat exchanger, for example. In certain embodiments, the de-superheating device can be located gravitationally above the evaporator or an evaporator condensate drainage point such that the de-superheating device drains to the evaporator condensate drainage point.

In certain embodiments, the condensate path can include a sub-cooling device configured to receive the condensate. The sub-cooling device can be in thermal communication (to cause heat transfer) with the chiller refrigerant and/or the refrigerant loop between the condenser and expansion valve. The sub-cooling device can be a heat exchanger. The sub-cooling device can be located gravitationally below the evaporator and/or an evaporator drainage point such that evaporator condensate from the evaporator drains to the sub-cooling device. The chiller system can be configured to fit underneath the refrigerated space to receive the condensate gravitationally. The refrigerated space can be an aircraft galley, for example. In certain embodiments, the chiller system can be configured to fit under a cabin floor in a sub-floor space. In certain embodiments, the chiller system can be configured to fit directly underneath the refrigerated space to provide cooled air directly to the refrigerated space without ducting.

In accordance with at least one aspect of this disclosure, an aircraft galley system can include a refrigerated space configured to receive one or more carts. The aircraft galley system can also include any suitable embodiment of a chiller system as disclosed herein, e.g., as described above.

In accordance with at least one aspect of this disclosure, a method can include using condensate from a refrigerated space to cool a refrigerant of chiller refrigeration system. Any other suitable method(s) and/or portion(s) thereof are contemplated herein. These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
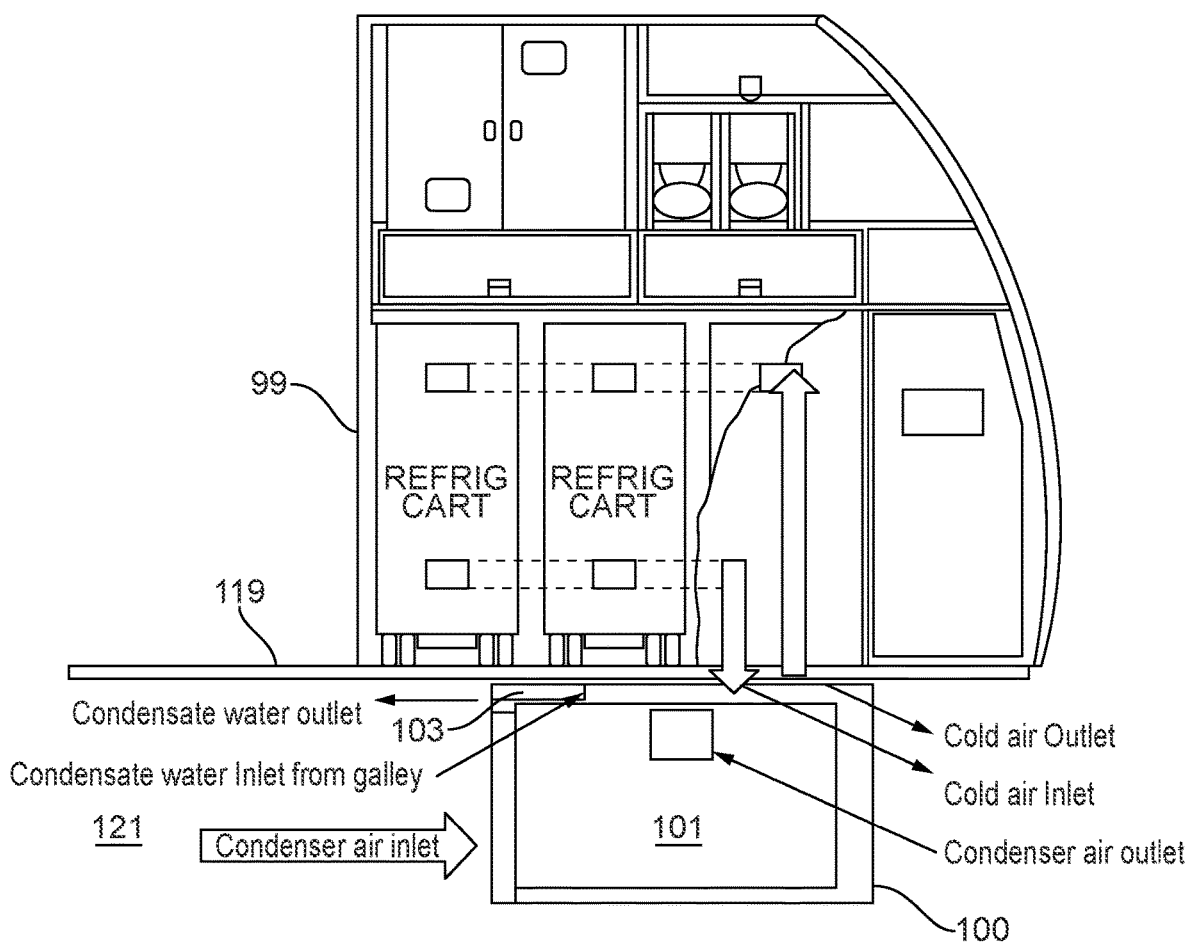
FIG. 1 illustrates an embodiment of a chiller system in accordance with this disclosure, shown disposed under a refrigerated space.

Reference will now be made to the drawings wherein like reference numerals identify similar structural features or aspects of the subject disclosure. For purposes of explanation and illustration, and not limitation, an illustrative view of an embodiment of a chiller system in accordance with the disclosure is shown in FIG. 1 and is designated generally by reference character 100. Other embodiments and/or aspects of this disclosure are shown in FIGS. 2A-3C. Certain embodiments described herein can be used to allow for more efficient chillers which can allow a reduction and size and/or weight of a chiller required to cool a space of a certain size, for example.

Figure 2A:
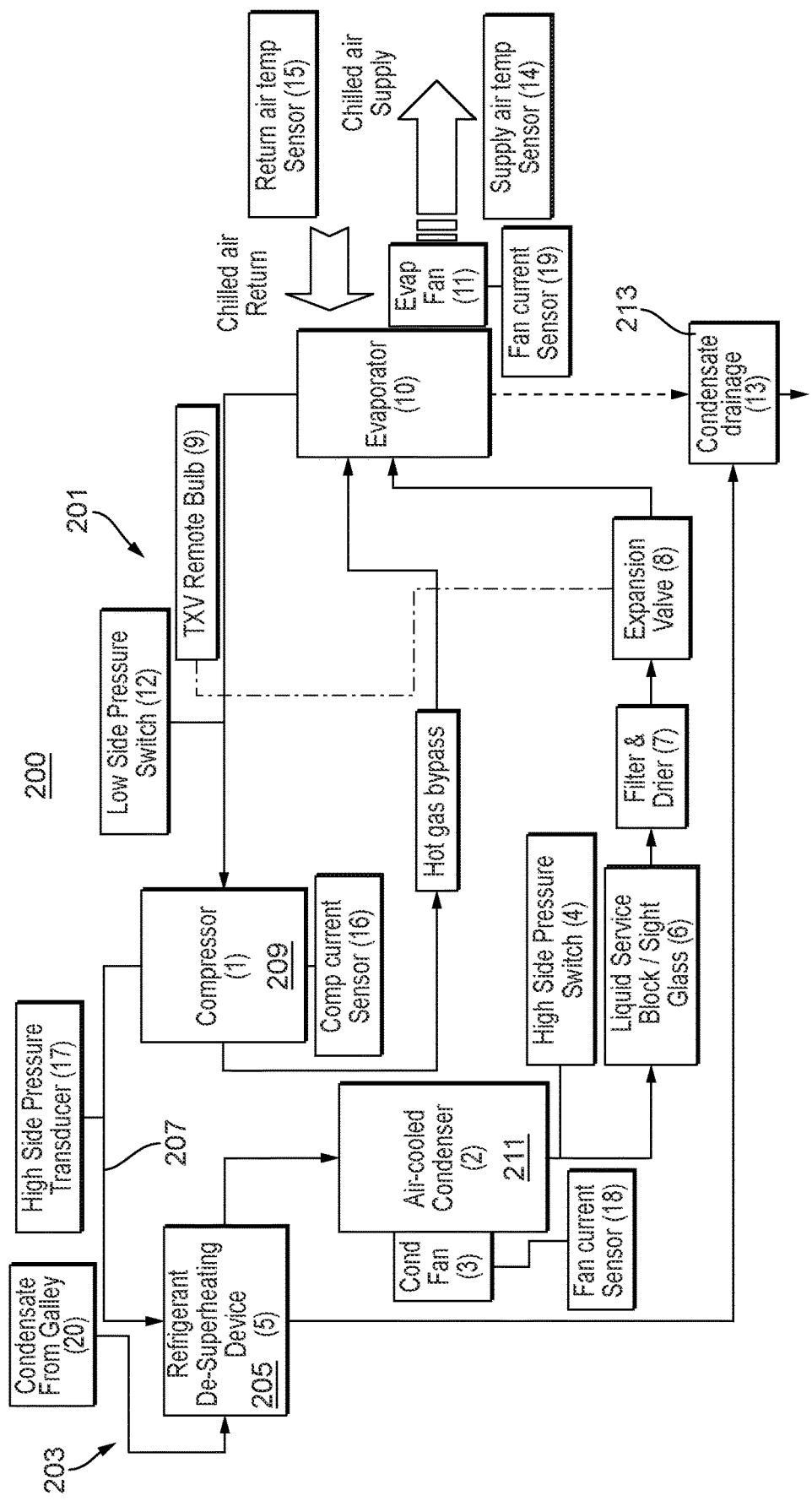
FIG. 2A is a schematic diagram of an embodiment of a chiller system in accordance with this disclosure, shown having de-superheating.
Figure 3A:
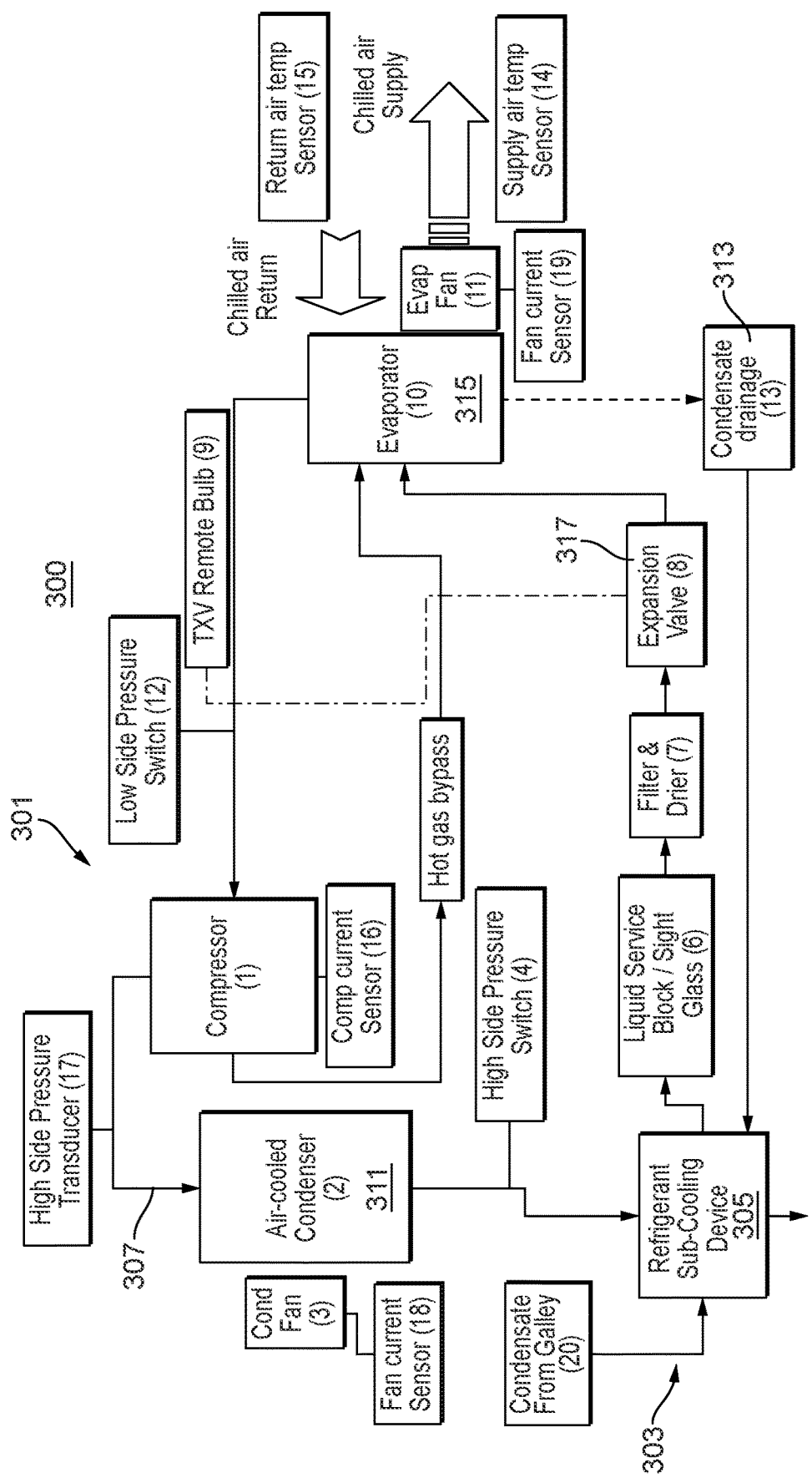
FIG. 3A is a schematic diagram of an embodiment of a chiller system in accordance with this disclosure, show having sub-cooling.

Referring to FIGS. 1, a chiller system 100 for a refrigerated space 99 can include a chiller refrigeration system 101. The chiller refrigeration system 101 can include any suitable refrigeration cycle components (e.g., a refrigerant loop for a chiller refrigerant to flow, a compressor, an evaporator, a condenser, an expansion device (e.g., expansion valve), etc., e.g., as shown in FIGS. 2A and 3A). The chiller system 100 can include a condensate path 103 configured to receive condensate from the refrigerated space 99 and to cool the chiller refrigerant in the chiller refrigeration system 101 using the condensate.

Referring to FIG. 2A, in certain embodiments of a chiller system 200, the condensate path 203 can include a de-superheating device 205 configured to receive the condensate from the refrigerated space 99 (e.g., an aircraft galley). The de-superheating device 205 can be in thermal communication (to cause heat transfer) with the chiller refrigerant and/or the refrigerant loop 207 between the compressor 209 and the condenser 211. In this regard, the de-superheating device 205 can exchange heat from the refrigerant to the condensate to cool the refrigerant before it enters the condenser 211.

The de-superheating device 205 can be a heat exchanger, for example. Any suitable heat exchanger is contemplated herein (e.g., forming part of refrigerant loop 207 for the refrigerant to flow through the device 205 isolated from the condensate).

Figure 2B:
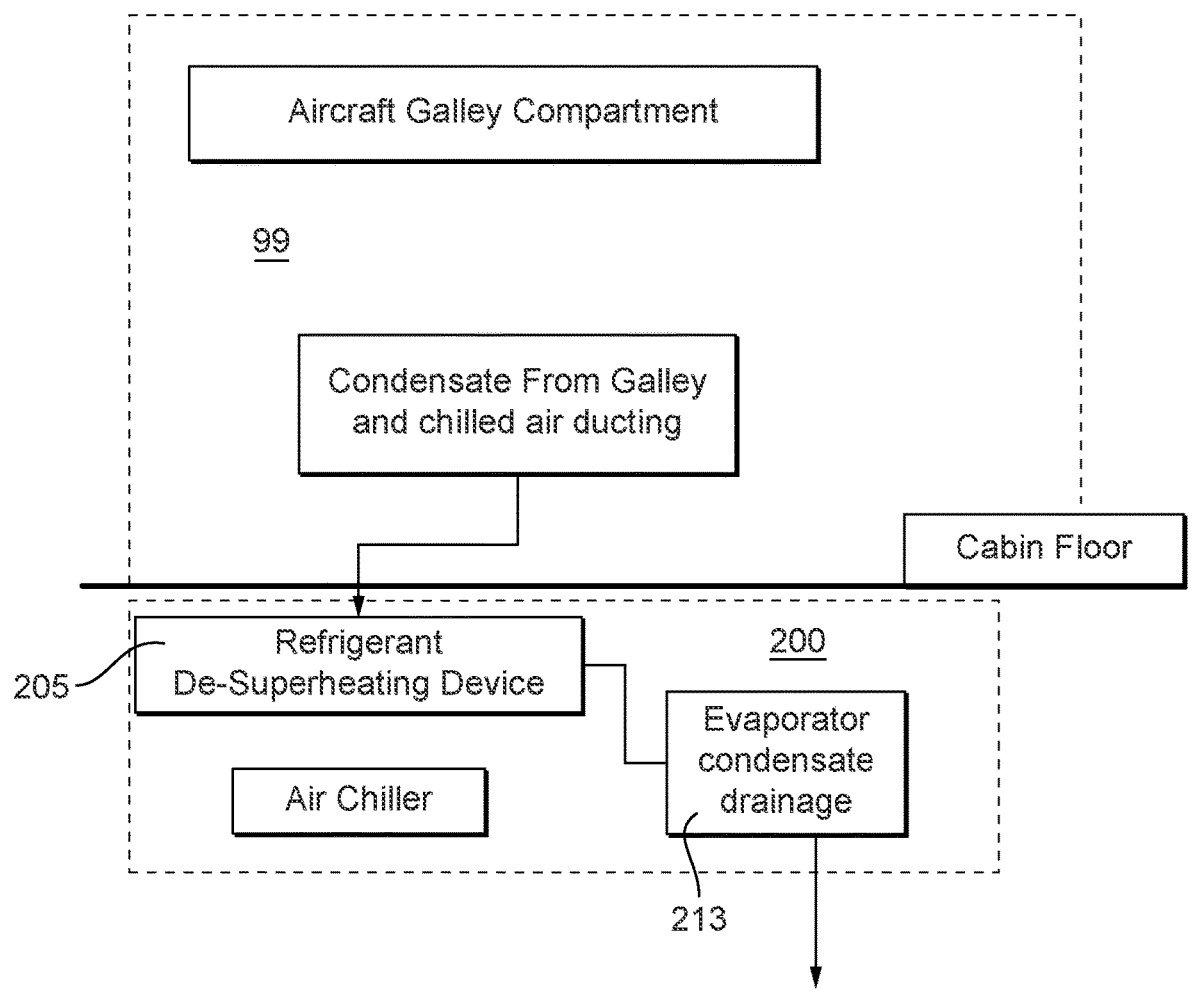
FIG. 2B is a schematic diagram of the embodiment of FIG. 2A, shown in gravitational relationship to the refrigerated space.
Figure 2C:
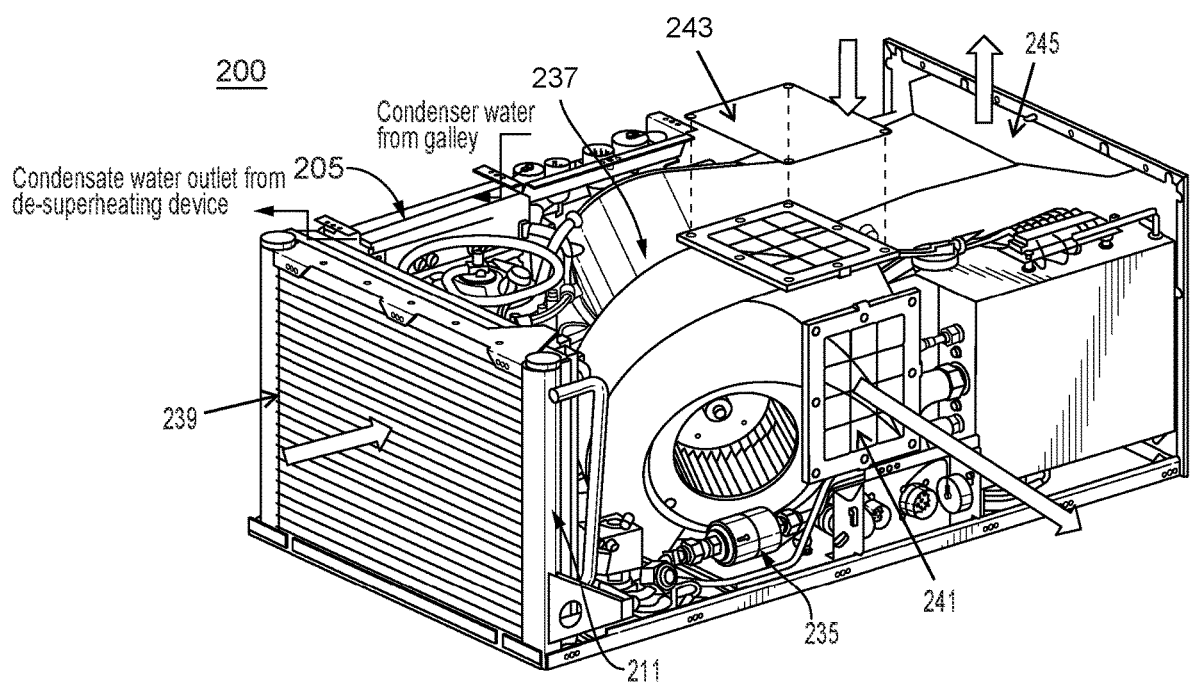
FIG. 2C is a perspective view of an embodiment of a chiller system in accordance with the embodiment of FIG. 2A.

Referring additionally to FIGS. 2B and 2C, in certain embodiments, the de-superheating device 205 can be located gravitationally above the evaporator or an evaporator condensate drainage point 213 such that the de-superheating device 205 drains to the evaporator condensate drainage point 213. Any other suitable location (e.g., reverse but pump fed to pump condensate to the drainage point 213) is contemplated herein.

FIG. 2C shows an embodiment of a chiller system 200 in accordance with this disclosure. As shown, FIG. 2, a chiller system 200 can include any suitable refrigeration components appreciated by those having ordinary skill in the art. For example, the system 200 can include the refrigeration components shown schematically in FIG. 2A. The form of the system 200 can be as shown, for example, configured to fit in a sub floor space of an aircraft. For example, the unit can take a substantially rectangular form. The system 200 can include a dryer filter 235 (e.g., to adsorb system contaminants (e.g., water) and to provide physical filtration), a condenser blower motor assembly 237 (e.g., for driving the condenser fan). The system 200 can include a condenser air inlet 239 positioned on a first side thereof to cool the condenser, e.g., as shown. The system 200 can include a condenser air outlet 241 on a second side perpendicular to the first side, e.g., as shown. The system 200 can include a cold air inlet 243 and a cold air outlet 245 on a top side of the system 200 such that cold air is circulated upwardly (e.g., inlet cold air and outlet cold air orthogonal to both the inlet condenser and the outlet condenser air) into a space above the system 200.

In certain embodiments, referring to FIG. 3A, the condensate path 303 can include a sub-cooling device 305 configured to receive the condensate. The sub-cooling device 305 can be in thermal communication with the chiller refrigerant and/or the refrigerant loop between the condenser 311 and an expansion valve 317 (e.g., upstream of the evaporator 315), e.g., as shown.

The sub-cooling device 305 can be a heat exchanger. Any suitable heat exchanger is contemplated herein (e.g., forming part of refrigerant loop 307 for the refrigerant to flow through the device 305 isolated from the condensate).

Figure 3B:
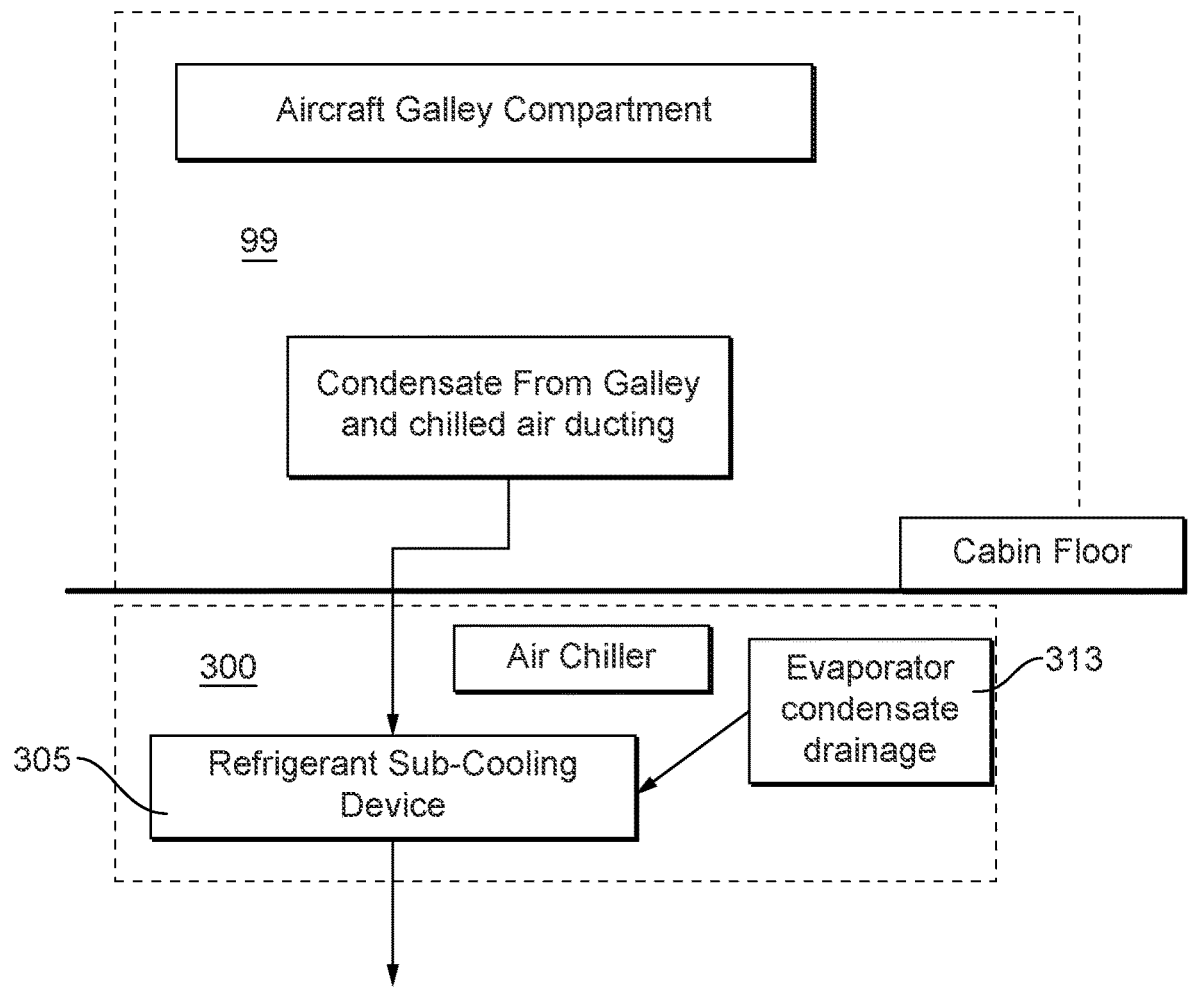
FIG. 3B is a schematic diagram of the embodiment of FIG. 3A, shown in gravitational relationship to the refrigerated space.
Figure 3C:
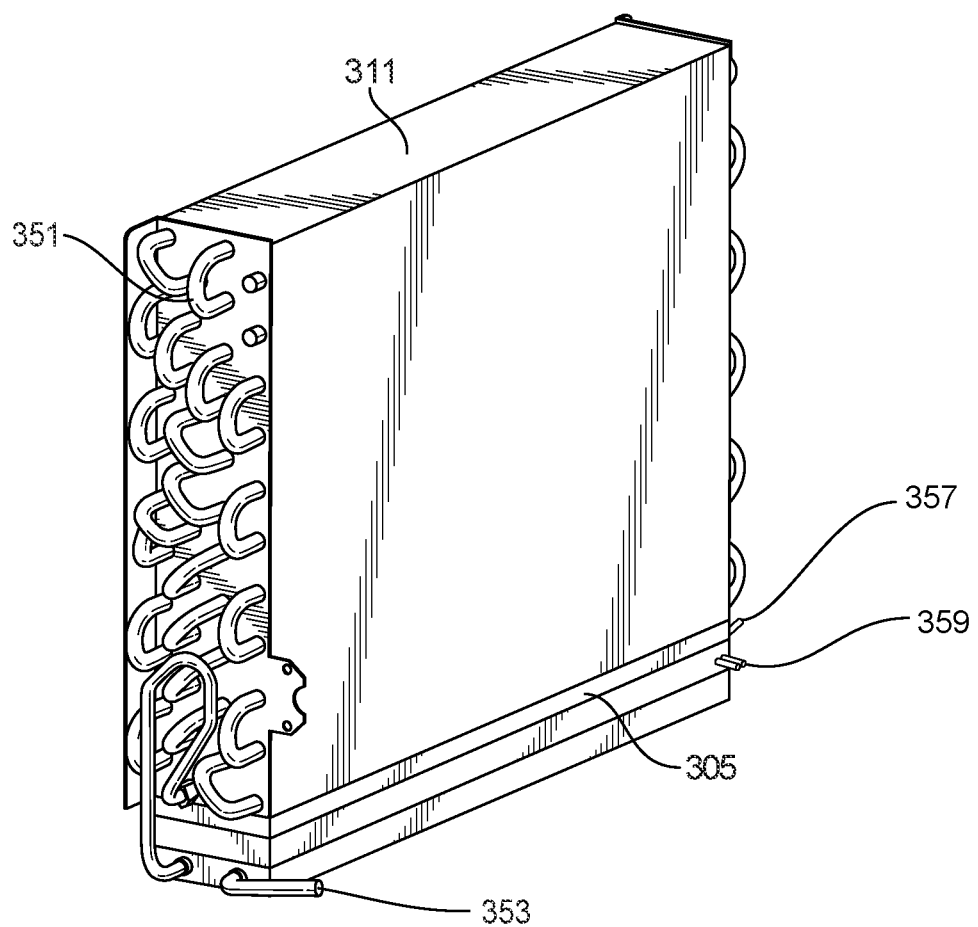
FIG. 3C is a perspective view of an embodiment of a condenser of the chiller system of FIG. 2A, shown having a sub-cooling device attached thereto.

Referring to FIGS. 3B and 3C, the sub-cooling device 305 can be located gravitationally below the evaporator 315 and/or an evaporator drainage point 313 such that evaporator condensate from the evaporator 315 drains to the sub-cooling device 305. Any other suitable location (e.g., gravitationally above but pump fed to pump evaporator condensate to the sub-cooling device 305) is contemplated herein.

FIG. 3C shows an embodiment of a condenser 311 connected thermally upstream of the sub-cooling device 305 in accordance with this disclosure. For example, the refrigerant inlet 351 can be positioned to allow refrigerant to enter into the condenser 311, flow through the condenser 311, then be in thermal communication with the sub-cooling device 305, then exit at a refrigerant outlet 353. The condensate can enter at the condensate inlet 357 into the device 305 and exit the condensate outlet 353.

As shown in FIGS. 1, 2B, and 3B, the chiller system 100, 200, 300 can be configured to fit underneath the refrigerated space 99 to receive the condensate gravitationally. Any other suitable position is contemplated herein, although a pump or additional ducting may be utilized which can increase complexity and weight.

The refrigerated space 99 can be an aircraft galley, for example. In certain embodiments, the chiller system 100, 200, 300 can be configured to fit under a cabin floor 119 in a sub-floor space 121, for example. In certain embodiments, the chiller system 100, 200, 300 can be configured to fit directly underneath the refrigerated space 99 to provide cooled air directly to the refrigerated space 99 without ducting, e.g., as shown in FIGS. 1, 2B, and 3B.

As appreciated by those having ordinary skill in the art in view of this disclosure, the refrigeration systems 101, 201, 301 can include any suitable components (e.g., refrigeration components, sensors, fans, switches, filters, etc., e.g., as shown). The condensate path 103, 203, 303 can include any suitable ducting made of any suitable material. In certain embodiments, both a de-superheating device 205 and a sub-cooling device 305 can be utilized in the same system (e.g., used simultaneously, separately, or any combination thereof to provide maximum efficiency under various operating conditions).

In accordance with at least one aspect of this disclosure, an aircraft galley system (e.g., as shown in FIG. 1) can include a refrigerated space 99 configured to receive one or more carts (e.g., standard galley carts to be refrigerated). The aircraft galley system can also include any suitable embodiment of a chiller system, e.g., system 100, 200, 300 as disclosed herein, e.g., as described above. In certain embodiments, the condensate (e.g., less than about 40° F./about 4.5 degrees C.) from galley may be introduced to the refrigerant de-superheating device to cool discharge superheat refrigerant vapor from the compressor, and reduce the refrigerant vapor temperature before getting into the condenser 209, 309, which can save electric energy by reducing the compressor refrigerant discharge temperature and pressure. In certain embodiments, a condensate (less than about 40° F./about 4.4 degrees C.) from galley may be introduced to the refrigerant sub-cooling device to cool refrigerant liquid from the condenser, and reduce the refrigerant liquid temperature before getting into the expansion valve and the evaporator which can increase the evaporator refrigerating effect by decreasing the flash gas after refrigerant expanding in throttling device.

In accordance with at least one aspect of this disclosure, a method can include using condensate from a refrigerated space 99 to cool a refrigerant of chiller refrigeration system, e.g., system 100, 200, 300. Any other suitable method(s) and/or portion(s) thereof are contemplated herein.

Embodiments enable cooling refrigerant with condensate water. Embodiments can be applied directly under a galley compartment in an aircraft to remove ducting and utilize condensate, reducing the size and weight of the overall system by improving efficiency.

Embodiments can include an aircraft under floor air chiller for aircraft galley cold storage for preservation of refrigerated food products (e.g., between about 0 to about 4° C./about 32 to about 39.2 degrees F.). Embodiments can include one or more of an air chiller with a refrigerant de-superheating device or with a refrigerant sub-cooling device, for example. Embodiments can be directly installed under the aircraft galley floor to minimize the ducting connection between the galley and air chillers. Embodiments can be easily installed, reduce the cooling heat loss in the chilled air ducting, better thermal management through less heat leakage from chiller air ducting, improve evaporator and fan performance by providing lower air pressure loss in chilled air recirculation system, reduce noise in the aircraft cabin by being in the sub-floor space, and prevent hot air ducting in the galley and instead to the sub-floor space or elsewhere. In embodiments, since the air chiller is installed under an aircraft galley cart compartment, the galley chilled condensate water can be fed via gravity and used to cool down the refrigerant discharge and high pressure vapor and/or refrigerant liquid, and increase refrigerating effect and decrease electric power consumption.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A chiller system for a refrigerated space, comprising:
   a chiller refrigeration system comprising a refrigerant loop for a chiller refrigerant to flow, a compressor, an evaporator, an expansion device, and a condenser; and
   a condensate path configured to receive condensate from the refrigerated space and to cool the chiller refrigerant in the chiller refrigeration system using the condensate, wherein the refrigerated space is an aircraft galley.

2. The chiller system of claim 1, wherein the condensate path includes a de-superheating device configured to receive the condensate, wherein the de-superheating device is in thermal communication with the chiller refrigerant or the refrigerant loop between the compressor and the condenser.

3. The chiller system of claim 2, wherein the de-superheating device is a heat exchanger.

4. The chiller system if claim 2, wherein the de-superheating device is located gravitationally above the evaporator or an evaporator condensate drainage point such that the de-superheating device drains to the evaporator condensate drainage point.

5. The chiller system of claim 2, wherein the sub-cooling device is located gravitationally below the evaporator or an evaporator drainage point such that evaporator condensate from the evaporator drains to the sub-cooling device.

6. The chiller system of claim 5, wherein the chiller system is configured to fit underneath the refrigerated space to receive the condensate gravitationally.

7. The chiller system of claim 6, wherein the chiller system is directly under a cabin floor in a sub-floor space.

8. The chiller system of claim 7, wherein the chiller system is configured to fit directly underneath the refrigerated space to provide cooled air directly to the refrigerated space without ducting.

9. The chiller system of claim 1, wherein the condensate path includes a sub-cooling device configured to receive the condensate, wherein the sub-cooling device is in thermal communication with the chiller refrigerant or the refrigerant loop between the condenser and an expansion valve.

10. The chiller system of claim 9, wherein the sub-cooling device is a heat exchanger.

11. An aircraft galley system, comprising:
    a refrigerated space configured to receive one or more carts; and
    a chiller system, comprising:
      a chiller refrigeration system comprising a refrigerant loop for a chiller refrigerant to flow, a compressor, an evaporator, expansion device, and a condenser; and
      a condensate path configured to receive condensate from the refrigerated space and to cool the chiller refrigerant in the chiller refrigeration system using the condensate
    wherein the refrigerated space is an aircraft galley.

12. The system of claim 11, wherein the condensate path includes a de-superheating device configured to receive the condensate, wherein the de-superheating device is in thermal communication with the chiller refrigerant or the refrigerant loop between the compressor and the condenser.

13. The system of claim 12, wherein the de-superheating device is a heat exchanger.

14. The system if claim 12, wherein the de-superheating device is located gravitationally above the evaporator or an evaporator condensate drainage point such that the de-superheating device drains to the evaporator condensate drainage point.

15. The system of claim 12, wherein the sub-cooling device is located gravitationally below the evaporator or an evaporator drainage point such that evaporator condensate from the evaporator drains to the sub-cooling device.

16. The system of claim 15, wherein the chiller system is gravitationally underneath the refrigerated space to receive the condensate gravitationally.

17. The system of claim 16, wherein the chiller system is positioned directly underneath the refrigerated space to provide cooled air directly to the refrigerated space without ducting.

18. The system of claim 11, wherein the condensate path includes a sub-cooling device configured to receive the condensate, wherein the sub-cooling device is in thermal communication with the chiller refrigerant or the refrigerant loop between the condenser and the evaporator or an expansion valve.

19. The system of claim 18, wherein the sub-cooling device is a heat exchanger.

20. A method, comprising:
  using condensate from a refrigerated space to cool a refrigerant of chiller refrigeration system, wherein the refrigerated space is an aircraft galley.

* * * * *